(12) United States Patent
Borowicz

(10) Patent No.: US 10,722,954 B2
(45) Date of Patent: Jul. 28, 2020

(54) DUAL CUTTING MILLING TOOLS AND RELATED METHODS

(71) Applicant: The Boeing Company, Chicago, IL (US)

(72) Inventor: Clifford D. Borowicz, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 2 days.

(21) Appl. No.: 16/158,104

(22) Filed: Oct. 11, 2018

(65) Prior Publication Data

US 2020/0114437 A1    Apr. 16, 2020

(51) Int. Cl.
*B23C 3/16*    (2006.01)

(52) U.S. Cl.
CPC ............ *B23C 3/16* (2013.01); *B23C 2210/24* (2013.01); *B23C 2215/04* (2013.01)

(58) Field of Classification Search
CPC ... B23C 2210/24; B23C 2215/04; B23C 3/00; B23C 3/023; B23C 3/16; B23C 3/18; B23C 5/10; B23C 5/02
See application file for complete search history.

(56) References Cited

U.S. PATENT DOCUMENTS

| | | | | |
|---|---|---|---|---|
| 6,007,281 A | * | 12/1999 | Eriksson | B23B 35/00 408/1 R |
| 6,200,078 B1 | * | 3/2001 | Kubota | B23B 51/048 407/53 |
| 6,582,165 B1 | * | 6/2003 | Baba | B23C 5/1036 407/40 |
| 6,869,259 B2 | * | 3/2005 | Lebkuechner | B23C 3/18 29/557 |
| 7,862,263 B2 | * | 1/2011 | van Iperen | B23C 5/10 407/54 |
| 8,142,119 B2 | * | 3/2012 | Volokh | B23C 3/02 407/53 |
| 8,602,698 B2 | * | 12/2013 | Craig | B23B 51/08 409/132 |
| 9,296,051 B2 | * | 3/2016 | Cigni | B23C 3/18 |
| 2005/0019115 A1 | * | 1/2005 | Gatton | B23B 41/00 408/30 |

(Continued)

*Primary Examiner* — Nicole N Ramos
(74) *Attorney, Agent, or Firm* — DaScenzo Intellectual Property Law, P.C.

(57) ABSTRACT

Dual cutting milling tools for removing material from a workpiece include two cutting portions, with one cutting portion being configured for ruled milling, and the other cutting portion being configured for hemstitch milling. In this manner, the number of tool changes for a given manufacturing process may be reduced. Dual cutting milling tools include a first cutting portion and a second cutting portion both formed in a shank, with the first cutting portion being configured to perform hemstitch milling on the workpiece, and the second cutting portion being configured to perform ruled milling on the workpiece. Methods of removing material from a workpiece may include both hemstitch milling the workpiece with the first cutting portion of the dual cutting milling tool and performing ruled milling of the workpiece with the second cutting portion of the dual cutting milling tool, without changing tools in the milling machine.

20 Claims, 8 Drawing Sheets

(56) References Cited

U.S. PATENT DOCUMENTS

| | | | |
|---|---|---|---|
| 2008/0159819 A1* | 7/2008 | Bui | B23C 3/12 |
| | | | 407/42 |
| 2014/0010609 A1* | 1/2014 | Trzaskos | B23C 3/12 |
| | | | 409/80 |
| 2015/0196963 A1* | 7/2015 | Bhagath | B23C 5/1045 |
| | | | 407/42 |
| 2015/0202696 A1* | 7/2015 | Lipczynski | B23B 51/009 |
| | | | 408/1 R |

* cited by examiner

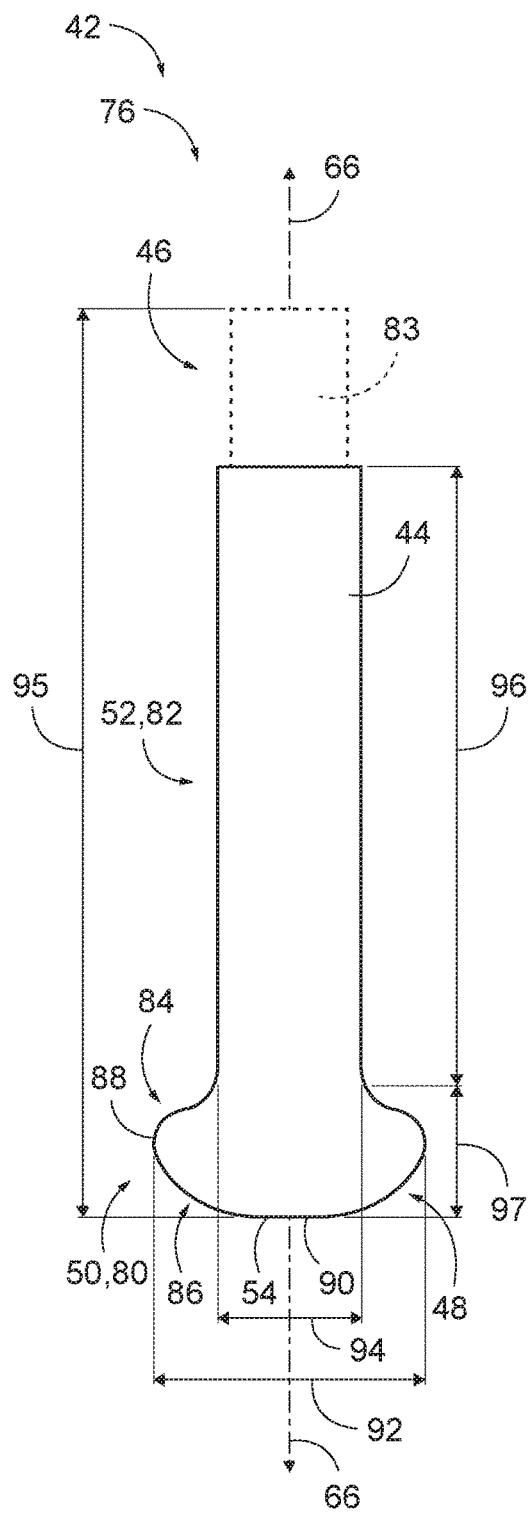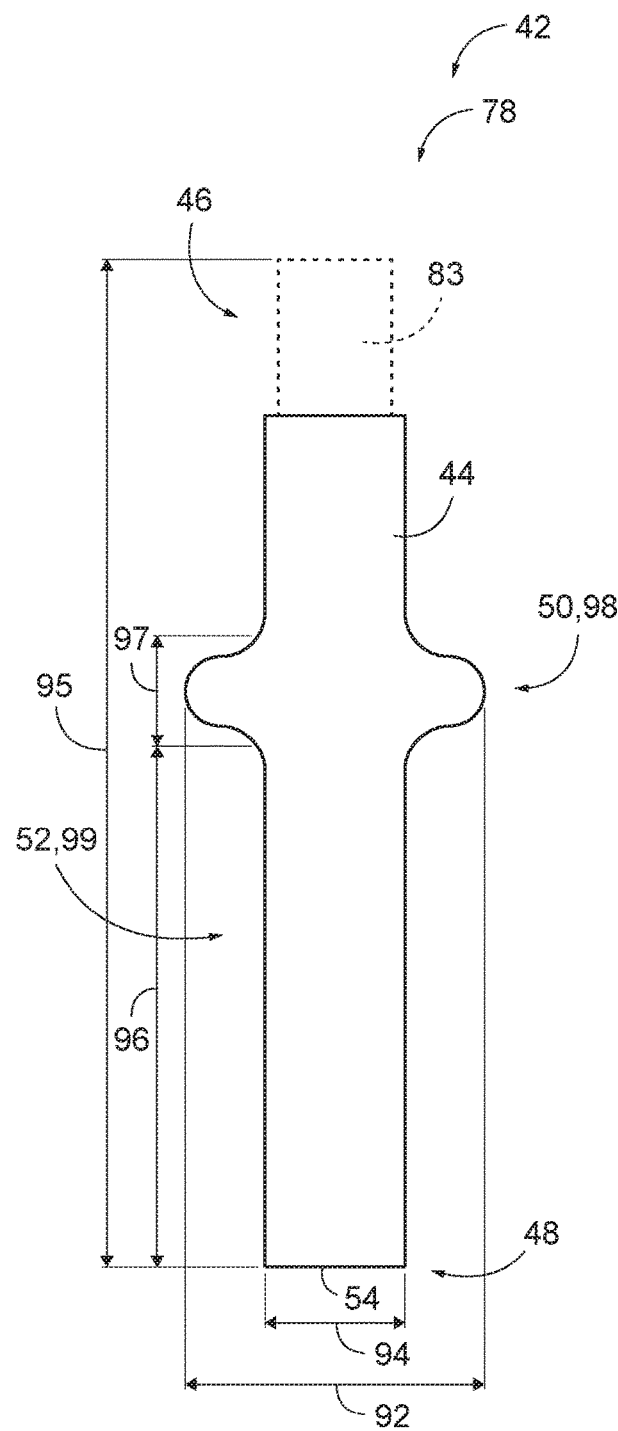
FIG. 6
FIG. 7

DUAL CUTTING MILLING TOOLS AND RELATED METHODS

FIELD

The present disclosure relates generally to dual cutting milling tools and related methods.

BACKGROUND

In manufacturing processes, multiple structural components are often manufactured separately and then assembled together. For example, tens or even hundreds (or more) of structural components may be assembled together to form structures in aerospace or aviation applications, such as in the manufacture of aircraft wings. Gaps between such structural components may result from manufacturing tolerances of the components and/or from unique challenges associated with certain materials. For example, in making composite parts, geometric variations in final parts may result from variations in fiber diameter and/or variations in resin volume, which may accumulate via a plurality of layers of material that are laid up to form the composite part.

In the assembly of a wing skin panel to ribs to form an aircraft wing-box, for example, some ribs may be in contact with the skin panel, while other ribs are spaced from it, due to such variations in the as-built ribs. FIG. 1 shows an example of a wing box structure for an aircraft wing 10. Generally, aircraft wing 10 includes a ladder-like structure formed by a plurality of ribs 12 spaced apart between one or more longer spars 14. Ribs 12 generally define the overall shape of aircraft wing 10, with a skin panel 16 (partially shown in dashed line, also referred to as a wing skin) being attached to ribs 12, conforming to the shape of the ribs 12. Because engagement between the skin panel 16 and ribs 12 is important to the structural strength of the wing-box, any gaps between them are generally filled by applying a liquid or solid shim between ribs 12 and skin panel 16, where needed (e.g., in the positions of the gaps). Placement of these shims is a generally time-consuming and expensive process. In some cases, composite structures may have to be assembled and disassembled several times to measure the shim gaps and drill and clean holes.

In some cases, material may be removed from the structural components and/or from the shims, to ensure proper engagement between the respective structural components and/or between a structural component and a shim. Cutting tools (e.g., milling machines with various end mill cutting tools) may be used to remove said material. For example, end mills are generally used for ruled milling of parts (which may also be referred to as plane milling, and generally results in cut areas with flat surfaces), and ball nose mills are generally used to cut curved or contoured areas in a process referred to as hemstitch milling. FIG. 2 illustrates an example of an end mill 18, which includes a shank 20 and a cutting portion 22. Cutting portion 22 is positioned adjacent a distal end region 24 of end mill 18, while a proximal end region 25 is defined by shank 20. Shank 20 is generally cylindrical and may be used to hold and locate end mill 18 in a milling machine. Cutting portion 22 includes one or more helical teeth 26, with one or more flutes 28 formed between helical teeth 26. Helical teeth 26 form a blade, or cutting surface, for removing material during cutting, while the removed material is moved up flute 28 during rotation of end mill 18, thereby clearing the material from the cutting surface. Helical teeth 26 are generally located on an end face 27 of end mill 18 (within distal end region 24), as well as on a periphery 29 of cutting portion 22 of end mill 18.

In use, and as shown in FIG. 3, end mill 18 generally is rotated about a longitudinal axis 30 of shank 20 (e.g., rotated as indicated by arrow 32), with distal end region 24 generally being vertically arranged (e.g., substantially normal to) the surface of a workpiece 34 being cut. When end mill 18 is rotated with respect to workpiece 34 in ruled milling applications, such an arrangement results in material being removed from workpiece 34, such as cut area 36 shown in FIG. 3.

FIG. 4 illustrates an example of a ball nose end mill 38, which may also be referred to as a ball end mill 38. Similar to end mill 18, ball nose end mill 38 includes shank 20 and cutting portion 22, with cutting portion 22 including one or more helical teeth 26 and one or more flutes 28 positioned between helical teeth 26. While the profile of end mill 18 is generally substantially flat at distal end region 24, ball nose end mill 38 generally is rounded, or semispherical at distal end region 24. In use, ball nose end mill 38 is passed across workpiece 34 multiple times and such hemstitch milling operations result in scallops 40, or ridges, formed in cut area 36 for each tool pass, based on the diameter of ball nose end mill 38.

Machining time is increased for each tool pass performed by the milling machine, and each time the cutting tool is changed. For example, in manufacturing processes where every second is significant, it may take a half an hour to change the tools between an end mill and a ball nose end mill, thereby increasing costs. While the time required for such tool changes is generally trivial in many manufacturing processes, it can be a significant expense in certain manufacturing scenarios, such as in assembling aircraft wings. Previous attempts at reducing machining time have involved tilting end mills at an angle with respect to the workpiece and attempting to use the end mill to perform the hemstitch operations, however, in doing so, just the tip of the end mill is able to be used in the cutting, which slows the speed at which the cutting is performed and results in uneven and excessive wear on the tools.

SUMMARY

Dual cutting milling tools according to the present disclosure include two cutting portions, with one cutting portion being configured for ruled milling, and the other cutting portion being configured for hemstitch milling. In this manner, no tool changes are necessary to switch between performing ruled and hemstitch milling, and yet the tool is not subject to excessive wear. Such dual cutting milling tools for removing material from a workpiece generally include a shank, with a first cutting portion and a second cutting portion both formed in the shank. The shank extends longitudinally from a proximal end region to a distal end region, with the dual cutting milling tool being configured to be secured to a milling machine via the proximal end region. The first cutting portion is configured to perform hemstitch milling on the workpiece, and the second cutting portion is configured to perform ruled milling on the workpiece. The first cutting portion may be positioned along the shank nearer to the proximal end region than is the second cutting portion, or vice versa. Such dual cutting milling tools according to the present disclosure are thus configured to perform both ruled and hemstitch milling without a tool change. Presently disclosed methods may include both hemstitch milling the workpiece with the first cutting portion of the dual cutting milling tool and performing ruled milling of the workpiece with the second cutting portion of the dual cutting milling tool, without changing tools in the milling machine.

BRIEF DESCRIPTION OF THE DRAWINGS

FIG. 6 is a schematic, cross-sectional representation of one example of a dual cutting milling tool according to the present disclosure.

FIG. 7 is a schematic, cross-sectional representation of another example of a dual cutting milling tool according to the present disclosure.

DESCRIPTION

Figure 5:
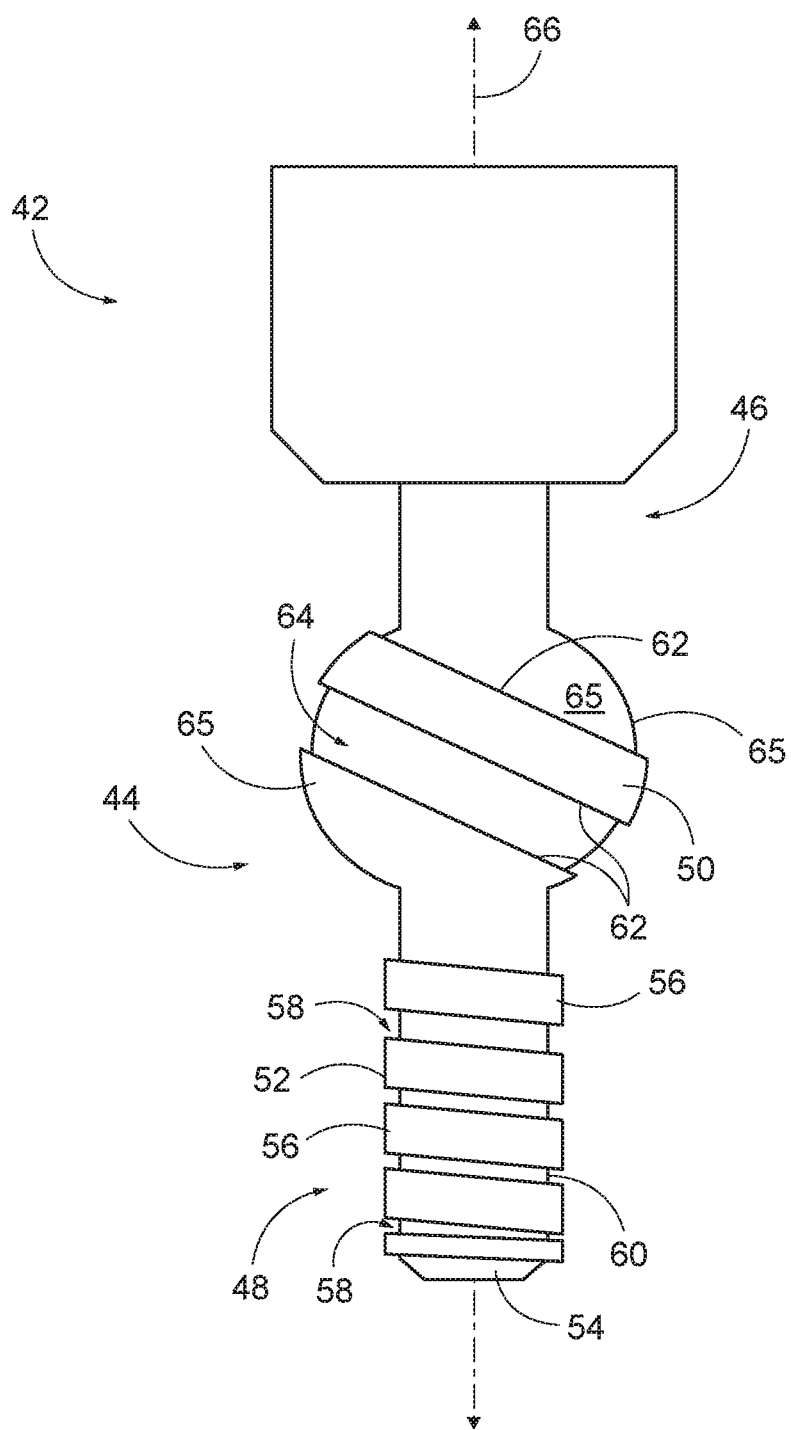
FIG. 5 is a schematic, side elevation representation of non-exclusive examples of a dual cutting milling tool according to the present disclosure.

FIG. 5 schematically illustrates examples of dual cutting milling tools 42 for removing material from a workpiece, according to the present disclosure. In general, in the figures, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular embodiment without departing from the scope of the present disclosure.

Figure 4:
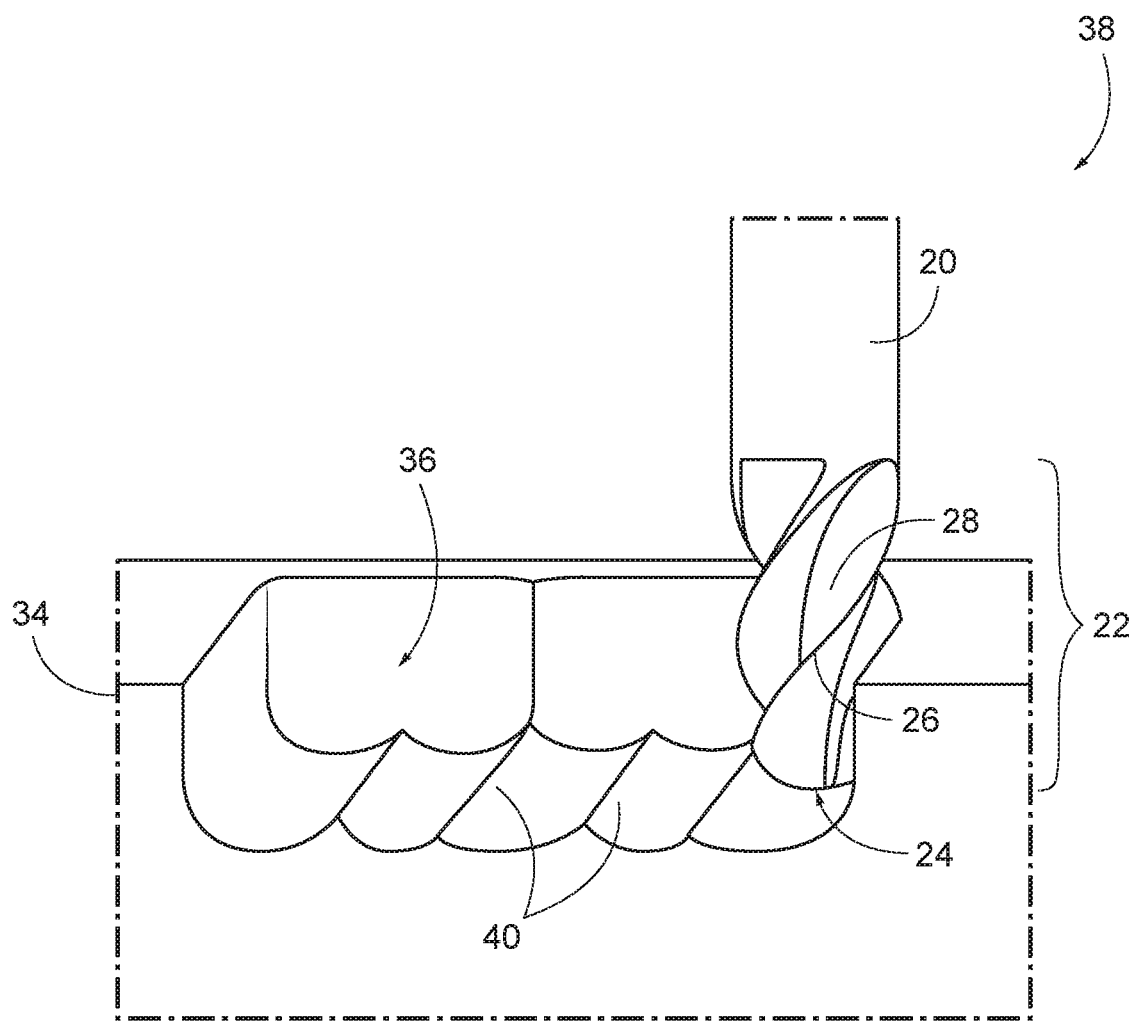
FIG. 4 is a perspective view of a hemstitch milling operation being performed on a workpiece using a prior art ball nose end mill.

Dual cutting milling tool 42 includes a shank, or shaft, 44 extending longitudinally from a proximal end region 46 to a distal end region 48, with a first cutting portion 50 and a second cutting portion 52 formed in shank 44. Second cutting portion 52 and first cutting portion 50, while formed in the same dual cutting milling tool 42, may be used to perform different operations on a workpiece, such as different types of milling, using a single tool. For example, first cutting portion 50 is formed in shank 44 and configured to perform hemstitch milling on a workpiece. As used herein, hemstitch milling refers to moving the milling tool along a combination of toolpaths to achieve the desired contour in the workpiece. Hemstitch milling generally includes one or more passes of the milling tool across the workpiece surface, followed by shifting the tool path, to remove material along a path adjacent to the previous pass. Each pass of the milling tool generally removes a certain depth of material from the workpiece in each of a series of adjacent scalloped rows (such as scallops 40 shown in FIG. 4), which together form the overall cut area of the workpiece. Such scalloped rows may be stitched together to form the desired curvature within the workpiece. In some examples, hemstitch milling may include multiple passes of the tool in the same areas, with additional tool path shifts, to reduce the scallop height between adjacent rows, to smooth out the contours of the cut area of the workpiece, and/or to adjust the final curvature or contour of the cut area of the workpiece. During hemstitch milling, the cutting surface of first cutting portion 50 is generally positioned substantially parallel to the workpiece surface being cut, although other arrangements of first cutting portion 50 with respect to the workpiece are also within the scope of the present disclosure.

Second cutting portion 52 is formed in shank 44, and configured to perform ruled milling on a workpiece, which may also be referred to as plane milling. As used herein, ruled milling refers to removal of material from a workpiece such that the cut area is generally rectangular in shape (e.g., having substantially vertical walls cut into the depth of the workpiece, and a substantially flat bottom surface, without scalloping), though the tool may be ramped into the workpiece. In some examples, during ruled milling, the cutting surface of second cutting portion 52 is generally positioned substantially normal to the workpiece surface being cut, but may be tilted or angled with respect to the workpiece surface. First cutting portion 50 and second cutting portion 52 are generally spaced apart from one another along shank 44, though may be adjacent and/or contacting one another, in some examples. In some examples, first cutting portion 50 is positioned nearer proximal end region 46 than is second cutting portion 52 (and second cutting portion 52 is positioned nearer distal end region 48 than is first cutting portion 50), though the relative positions of first cutting portion 50 and second cutting portion 52 may be reversed in some examples. Second cutting portion 52 may be positioned adjacent and/or within distal end region 48 of shank 44. For example, second cutting portion 52 may extend from an end face 54 of dual cutting milling tool 42, towards proximal end region 46. Similarly, in other examples, first cutting portion 50 may be positioned adjacent and/or within distal end region 48 of shank 44. For example, first cutting portion 50 may extend from end face 54 of dual cutting milling tool 42, towards proximal end region 46.

Figure 1:
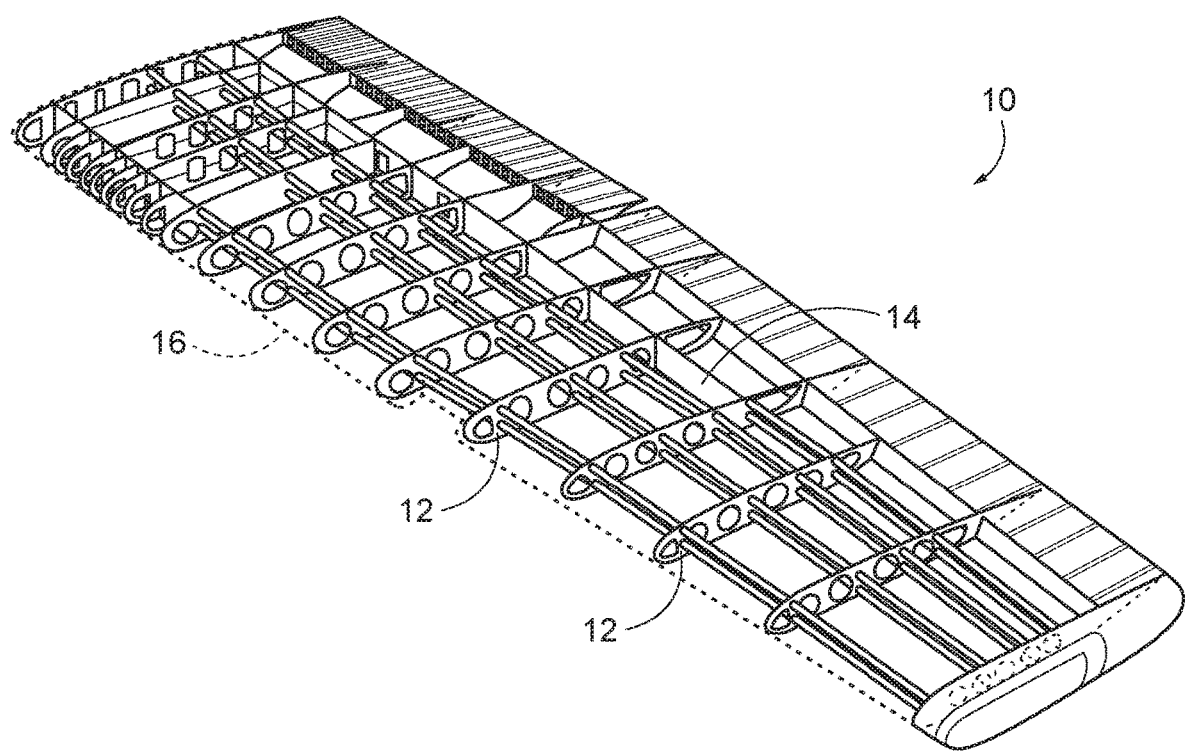
FIG. 1 is a perspective view of a prior art example of a structure for an aircraft wing.
Figure 2:
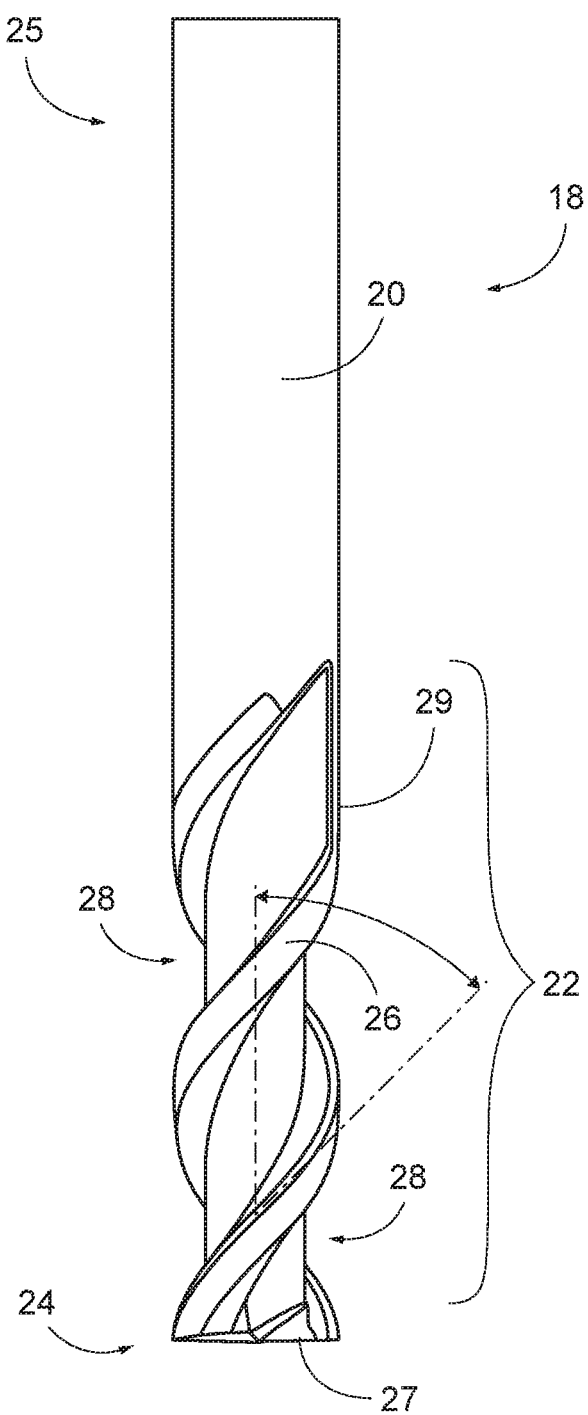
FIG. 2 is a side elevation view of a prior art end mill.
Figure 3:
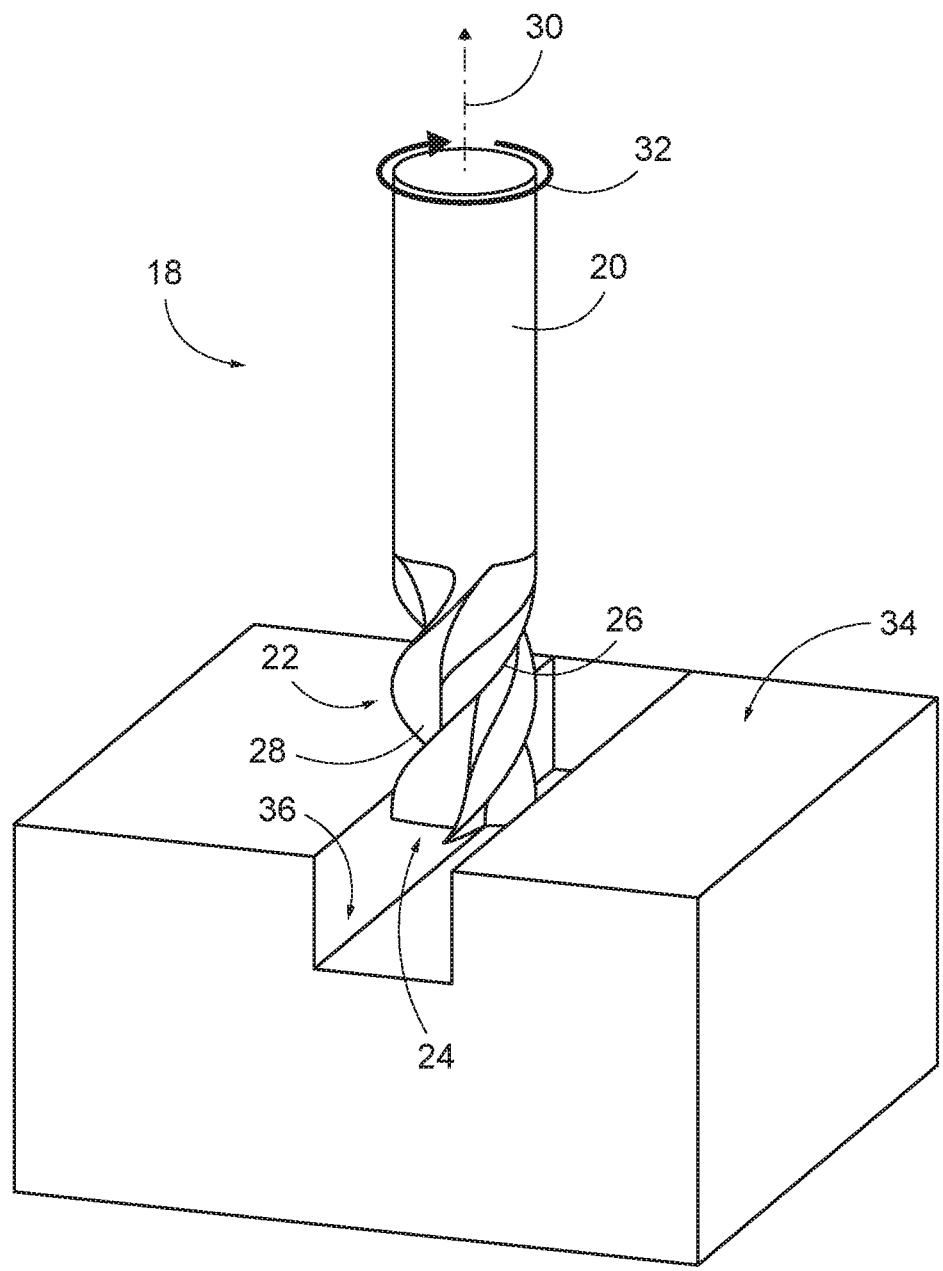
FIG. 3 is a perspective view of a ruled milling operation being performed on a workpiece using a prior art end mill.

First cutting portion 50 and second cutting portion 52 are positioned relative to one another such that dual cutting milling tool 42 is configured to perform both ruled milling and hemstitch milling on a given workpiece, without changing the tool in the milling machine. In other words, while prior art techniques involved using different tools for performing these different milling operations, presently disclosed dual cutting milling tools 42 allow for a single tool to perform both milling operations, while preventing undue wear to the tool. Various examples of dual cutting milling tools 42 according to the present disclosure thus may increase the value of said milling tools, provide for faster milling of a given workpiece, increase efficiency, reduce machining costs for a given workpiece, and/or reduce wear and/or dulling of the tool (e.g., as compared to performing hemstitch milling with a conventional end mill, such as end mill 18 shown in FIG. 2). Additionally or alternatively, disclosed dual cutting milling tools 42 may be used to maximize the amount of ruled milling as compared to hemstitch milling performed for a given operation, and/or to decrease the needed footprint in factory for the milling operations.

First cutting portion 50 is generally bulbous, semispherical, or spherical in shape, whereas second cutting portion 52 is generally cylindrical in overall shape. In other words, first cutting portion 50 generally protrudes away from shank 44, whereas second cutting portion 52 generally has a similar size and shape as the remainder of shank 44.

Second cutting portion 52 includes one or more helical teeth 56 wrapping around second cutting portion 52, with one or more flutes 58 formed between helical teeth 56. Helical teeth 56 form a blade, or cutting surface, for removing material during cutting, while the removed material is moved up flute 58 during rotation of dual cutting milling tool 42, thereby clearing the material from the cutting surface. In some examples, helical teeth 56 may be serrated. Helical teeth 56 may be located on end face 54 and/or on a periphery 60 of shank 44 within second cutting portion 52, and thus second cutting portion 52 may be configured to remove material from a workpiece using end face 54 and/or periphery 60 within second cutting portion 52. Second cutting portion 52 may include any number of helical teeth 56, such as one tooth, two teeth, three teeth, four teeth, five teeth, six teeth, seven teeth, and/or eight or more teeth. Said helical teeth 56 generally extend around periphery 60 of shank 44 within second cutting portion 52, with each helical tooth 56 having one or more flutes 58 associated therewith. For example, each helical tooth 56 may include one, two, three, or four or more flutes 58, with said flutes 58 being positioned between adjacent respective helical teeth 56. Each respective helical tooth 56 may extend longitudinally along substantially the entire second cutting portion 52, or along just a portion of second cutting portion 52.

Similarly, first cutting portion 50 includes one or more helical teeth 62 wrapping around first cutting portion 50, with one or more flutes 64 formed between helical teeth 62. First cutting portion 50 may include any number of helical teeth 62, such as one tooth, two teeth, three teeth, four teeth, five teeth, six teeth, seven teeth, and/or eight or more teeth. In some examples, helical teeth 62 may be serrated. Said helical teeth 62 generally extend around periphery 60 of shank 44 within first cutting portion 50, with each helical tooth 62 having one or more flutes 64 associated therewith. For example, each helical tooth 62 may include one, two, three, or four or more flutes 64, with said flutes 64 being positioned between adjacent respective helical teeth 62. Each respective helical tooth 62 may extend longitudinally along substantially the entire first cutting portion 50, or along just a portion of first cutting portion 50. When removing material with first cutting portion 50, dual cutting milling tool 42 is generally positioned with respect to the workpiece such that a side region 65 contacts the workpiece.

End face 54 of second cutting portion 52 may be shaped like an end mill, a face mill, a slot end mill, a ball nose end mill, a bull nose end mill, a grit cutter, and/or any other suitable milling tool. Dual cutting milling tool 42 may be formed of tool steel, high speed steel, cemented carbide, cobalt steel alloys, tungsten carbide, and/or any other suitable material. In some examples, dual cutting milling tool 42 (or a portion thereof, such as first cutting portion 50 and/or second cutting portion 52) may be coated with one or more materials, such as polycrystalline diamond, ceramics, titanium aluminum nitride (TiAlN), titanium nitride (TiN), titanium carbon nitride (TiCN), and/or any other suitable material. For example, dual cutting milling tool 42 may be coated with a material configured to prevent dulling of the cutting portions and/or reduce wear of the cutting portions. Additionally or alternatively, dual cutting milling tools 42 may include one or more inserts (e.g., of tungsten carbide) positioned to prevent premature or excessive dulling of dual cutting milling tool 42, such as near end face 54 of second cutting portion 52.

First cutting portion 50 generally has a larger overall diameter than shank 44 and second cutting portion 52. For example, the diameter of first cutting portion 50 may be at least 10% larger, at least 20% larger, at least 30% larger, at least 40% larger, at least 50% larger, at least 60% larger, at least 70% larger, at least 80% larger, at least 90% larger, and/or at least 100% larger than the diameter of shank 44 and/or the diameter of second cutting portion 52. In some examples, the relative size of first cutting portion 50 with respect to second cutting portion 52 may be at least partially determined by the workpiece, with first cutting portion 50 being large enough relative to second cutting portion 52 such that second cutting portion 52 does not contact the workpiece when first cutting portion 50 is being used to remove material from the workpiece. Similarly, first cutting portion 50 may be spaced apart from second cutting portion 52 along shank 44 sufficiently such that first cutting portion 50 does not contact the workpiece when second cutting portion 52 is being used to remove material from the workpiece. Dual cutting milling tools 42 according to the present disclosure may be especially adapted to remove materials from specifically shaped workpieces (e.g., spar caps for aircraft wings), with dual cutting milling tool 42 being shaped with respect to the shape of the workpiece to prevent interference from other portions of the cutting tool. In other examples, both first cutting portion 50 and second cutting portion 52 may both be in contact with the workpiece, when in use.

Turning now to FIGS. 6-7, illustrative non-exclusive examples of dual cutting milling tools 42, in the form of dual cutting milling tool 76 (FIG. 6) and dual cutting milling tool 78 (FIG. 7), are illustrated. Where appropriate, the reference numerals from the schematic illustration of FIG. 5 are used to designate corresponding parts of dual cutting milling tool 76, 78; however, the examples of FIGS. 6-7 are non-exclusive and do not limit dual cutting milling tool 42 to the illustrated embodiments. That is, dual cutting milling tools 42 are not limited to the specific examples illustrated in FIGS. 6-7, and may incorporate any number of the various aspects, configurations, characteristics, properties, etc. that are illustrated in and discussed with reference to the schematic representation of FIG. 5 and/or the examples of FIGS. 6-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to dual cutting milling tool 76, 78; however, it is within the scope of the present disclosure that the previously discussed features, variants, etc. may be utilized therewith.

FIG. 6 schematically illustrates a cross-sectional, side elevation view of dual cutting milling tool 76, which is an example of dual cutting milling tool 42. Dual cutting milling tool 76 includes a first cutting portion 80 (which is an example of first cutting portion 50) and a second cutting portion 82 (which is an example of second cutting portion 52), with first cutting portion 80 being configured to perform hemstitch milling on a workpiece, and second cutting portion 82 being configured to perform ruled milling on a workpiece. As shown in FIG. 6, in this example, first cutting portion 80 is positioned within distal end region 48, whereas second cutting portion 82 is positioned nearer proximal end region 46. First cutting portion 80 is bulbous, while second cutting portion 82 is generally cylindrical. While both first cutting portion 80 and second cutting portion 82 include at least one helical tooth for cutting (e.g., milling, or removing material from a workpiece), said teeth are not shown in FIG. 6, for clarity. As indicated in dashed line, proximal end region 46 may include a coupling portion 83 for coupling dual cutting milling tool 76 to a milling machine. In some examples, and as shown, coupling portion 83 may have a smaller (or larger) diameter and/or a different shape than shank 44.

As shown in FIG. 6, first cutting portion 80 includes a plurality of different radii of curvature when viewed in the cross-sectional plane shown in FIG. 6. For example, first cutting portion 80 includes at least a first zone 84 having a first radius of curvature, and a second zone 86 having a second radius of curvature, with the first and second radii of curvature being different from each other. In other examples, first cutting portion 80 may include one or more additional zones having one or more additional radii of curvature. Such zones 84, 86 of differing curvature may enable faster and/or more complex milling operations to be performed by first cutting portion 80, as compared to cutting portions with a simpler shape. In some examples, such dual cutting milling tools 76 with first cutting portions 80 may be configured for use in, for example, a four- or five-axis mill.

First zone 84 and second zone 86 may be smoothly continuous with one another. For example, a curve, or contour, 88 formed in the plane shown in FIG. 6 by first zone 84 and second zone 86 may be continuously differentiable in some examples. In some examples, the first radius of curvature of first zone 84 is less than the second radius of curvature of second zone 86. In other examples, the first radius of curvature of first zone 84 is greater than the second radius of curvature of second zone 86. Additionally or alternatively, end face 54 of dual cutting milling tool 76 may be curved, or may have a substantially flattened portion 90, as illustrated.

First cutting portion 80 generally has a larger overall diameter than shank 44 and second cutting portion 82, such that first cutting portion 80 protrudes radially outwardly beyond second cutting portion 82. For example, a first overall maximum diameter, or width, 92 of first cutting portion 80 is greater than a second overall maximum diameter 94 of second cutting portion 82 in the example shown in FIG. 6. Maximum overall diameter may be defined as the diameter of the smallest sphere that circumscribes first cutting portion 80.

The height of second cutting portion 82 is greater than the height of first cutting portion 80 in the example shown in FIG. 6. For example, a first longitudinal height 97 of first cutting portion 80 is less than a second longitudinal height 96 of second cutting portion 82. Second longitudinal height 96 generally corresponds to the length of the effective cutting surface of second cutting portion 82, along the longitudinal axis 66 of dual cutting milling tool 76. Second longitudinal height 96 may be at least 10% greater, at least 20% greater, at least 30% greater, at least 40% greater, at least 50% greater, at least 60% greater, at least 70% greater, at least 80% greater, at least 90% greater, at least 100% greater, at least 150% greater, at least 200% greater, at least 300% greater, at least 400% greater, at least 500% greater, at least 600% greater, and/or at least 700% greater than first longitudinal height 97, in various examples. In some examples, such as in the example of FIG. 6, second longitudinal height 96 is at least fifty percent of an overall height 95 of dual cutting milling tool 76. In other words, second longitudinal height 96 may represent a majority of the overall height of dual cutting milling tools 76.

FIG. 7 schematically illustrates a cross-sectional, side elevation view of dual cutting milling tool 78, which is an example of dual cutting milling tool 42. Dual cutting milling tool 78 includes first cutting portion 98 (which is an example of first cutting portion 50) and second cutting portion 99 (which is an example of second cutting portion 52), with first cutting portion 98 being configured to perform hemstitch milling on a workpiece, and second cutting portion 99 being configured to perform ruled milling on a workpiece. As shown in FIG. 7, in this example, second cutting portion 99 is positioned adjacent distal end region 48, whereas first cutting portion 98 is positioned nearer proximal end region 46. First cutting portion 98 is bulbous, while second cutting portion 99 is generally cylindrical. While both first cutting portion 98 and second cutting portion 99 include at least one helical tooth for cutting (e.g., milling, or removing material from a workpiece), said teeth are not shown in FIG. 7, for clarity.

As with the example shown in FIG. 6, in the example of dual cutting milling tool 78 of FIG. 7, first overall maximum diameter (or width) 92 of first cutting portion 98 (in the plane illustrated in FIG. 7) is greater than second overall maximum diameter 94 of second cutting portion 99. Further, first longitudinal height 97 of first cutting portion 98 is less than second longitudinal height 96 of second cutting portion 99. Similar to the example of FIG. 9, the length of second cutting portion 99 accounts for a majority of the height of dual cutting milling tool 78 (e.g., second longitudinal height 96 is greater than 50% of overall height 95 of dual cutting milling tool 78).

Dual cutting milling tools 42 according to the present disclosure, such as dual cutting milling tool 76 and dual cutting milling tool 78, are generally configured to be secured to a milling machine (e.g., a CNC machine) within proximal end region 46 of shank 44. To accommodate such securement, proximal end region 46 of shank 44 may be cylindrical, may have a square or polygonal cross-sectional area, may be slotted, may have a pin, and/or otherwise may be configured to engage a milling machine (e.g., via coupling portion 83 shown in the examples of FIGS. 6-7) such that in operation, the milling machine may rotate dual cutting milling tool 42 about a longitudinal axis 66 (FIG. 5) of shank 44.

Figure 8:
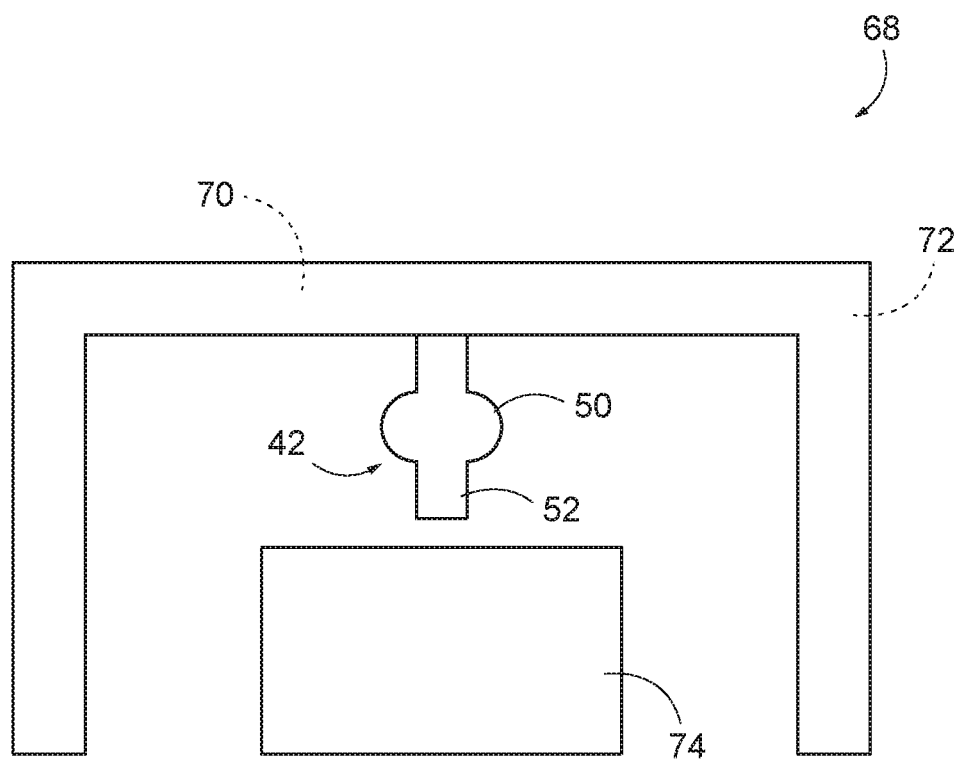
FIG. 8 is a schematic representation of systems including dual cutting milling tools according to the present disclosure.

For example, FIG. 8 schematically represents examples of systems 68 according to the present disclosure, with dual cutting milling tool 42 begin secured in a milling machine 70 (e.g., a CNC milling machine 70) and/or a gantry 72, such that dual cutting milling tool 42 is positioned and supported with respect to a workpiece 74 such that dual cutting milling tool 42 removes material from workpiece 74 in one or more desired locations, such as to prepare workpiece 74 for assembly. Workpiece 74 may be any suitable workpiece, such as a metallic or composite workpiece. In some examples, workpiece 74 may be an assembly of a plurality of structural components. In some examples, workpiece 74 may be a portion of an aircraft, such as a wing for an aircraft. In some examples, workpiece 74 may include a plurality of ribs, one or more spars, one or more spar caps, one or more shear ties, and/or one or more wing skin panels for an aircraft wing. In other examples, workpiece 74 may be any other structure, component, or assembly, wherein two or more parts are engaged with one another.

System 68 may be configured to remove material from a plurality of different locations, or areas, of workpiece 74. For example, milling machine 70 and/or gantry 72 may be used to move dual cutting milling tool 42 with respect to workpiece 74 such that dual cutting milling tool 42 is positioned to remove material from different areas. In the specific example of an aircraft wing, dual cutting milling tool 42 may be used to remove material from a plurality of different interfaces within the wing (e.g., by removing material from a plurality of different ribs, a plurality of different shear ties, and/or a plurality of different locations within a given rib, spar, and/or spar cap). In one specific example, dual cutting milling tool 42 may be used to profile a perimeter surface of rib shear ties using second cutting portion 52. Then, with workpiece 74 (e.g., one or more rib shear ties) held in position, dual cutting milling tool 42 may be moved with respect to workpiece 74 such that second cutting portion 52 is positioned past (e.g., away from) workpiece 74, and such that first cutting portion 50 can perform hemstitch milling on workpiece 74. In other examples, the relative positions of first cutting portion 50 and second cutting portion 52 may be reversed from what is shown in FIG. 8.

In some examples, dual cutting milling tool 42 is positioned and oriented substantially vertically with respect to workpiece 74 when removing material with second cutting portion 52, and dual cutting milling tool 42 may be positioned and oriented substantially parallel to workpiece 74 (e.g., parallel to the workpiece surface being milled) when removing material using first cutting portion 50. Moving dual cutting milling tool 42 may include moving the tool laterally with respect to workpiece 74, moving the tool vertically towards and/or away from workpiece 74, and/or tilting the tool with respect to workpiece 74. In some examples, dual cutting milling tool 42 is positioned in one orientation when removing material using second cutting portion 52, and is positioned in a different orientation with respect to workpiece 74 when removing material using first cutting portion 50. For example, dual cutting milling tool 42 may be rotated, or tilted, by at least 5 degrees, at least 10 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, at least 120 degrees, at least 130 degrees, at least 140 degrees, at least 150 degrees, at least 160 degrees, and/or at least 170 degrees, with respect to workpiece 74, when using different respective portions of the tool. In one specific example, dual cutting milling tool 42 may be tilted by about 90 degrees to switch from removing material via first cutting portion 50 to removing material via second cutting portion 52, and vice versa.

Figure 9:
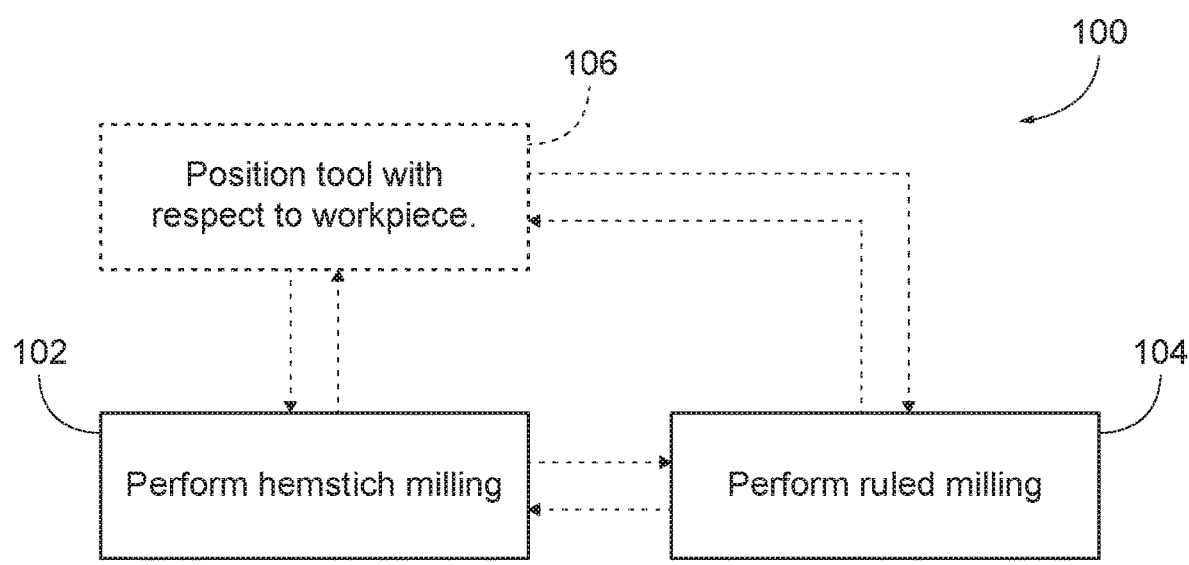
FIG. 9 is a schematic flowchart diagram illustrating representative methods of using dual cutting milling tools, according to the present disclosure.

FIG. 9 schematically provides a flowchart that represents illustrative, non-exclusive examples of methods 100 according to the present disclosure. In FIG. 9, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 9 are not limiting, and other methods and steps are within the scope of the present disclosure, including methods having greater than or fewer than the number of steps illustrated, as understood from the discussions herein.

As shown in FIG. 9, methods 100 generally include hemstitch milling a workpiece (e.g., workpiece 74) with a first cutting portion of a dual cutting milling tool (e.g., first cutting portion 50 of dual cutting milling tool 42) at 102, and performing ruled milling of the workpiece with a second cutting portion of the dual cutting milling tool (e.g., second cutting portion 52) at 104, without changing tools. In some examples, hemstitch milling may be performed at 102 before and/or after performing the ruled milling at 104. Similarly, performing the ruled milling at 104 may be performed before and/or after the performing the hemstitch milling at 102. In some examples, the performing hemstitch milling at 102 and/or the performing ruled milling at 104 may be performed multiple times on a given workpiece. For example, hemstitch milling may be performed at 102 at a plurality of different locations of the workpiece, and/or ruled milling may be performed at 104 at a plurality of different locations of the workpiece. In some examples, each instance of performing hemstitch milling at 102 may be alternated with an instance of performing ruled milling at 104.

Methods 100 may also include positioning the dual cutting milling tool with respect to the workpiece, at 106. Such positioning at 106 may be performed a plurality of times for a given operation, thereby providing for removing material from the workpiece in a plurality of different locations. Additionally or alternatively, the positioning the tool at 106 may be performed before and/or after performing the hemstitch milling at 102, and/or before and/or after performing the rule milling at 104. For example, the tool may be positioned at 106 to perform the hemstitch milling at 102, and then positioned again at 106 to perform the ruled milling at 104. In other words, the tool may be positioned (or repositioned) at 106 between performing the hemstitch milling at 102 and performing the ruled milling at 104. Positioning the tool at 106 may include moving the tool to different locations with respect to the workpiece, changing the distance between the tool and the workpiece, and/or changing an angle and/or orientation of the tool with respect to the workpiece. In some examples, positioning the tool at 106 includes arranging the dual cutting milling tool such that the first cutting portion contacts the workpiece and such that the second cutting portion is spaced apart from the workpiece (such as when the first cutting portion is being used to perform hemstitch milling on the workpiece at 102). Similarly, in some examples, positioning the tool at 106 includes arranging the dual cutting milling tool such that the second cutting portion contacts the workpiece and such that the first cutting portion is spaced apart from the workpiece (such as when the second cutting portion is being used to perform ruled milling on the workpiece at 104). Positioning the tool at 106 may be performed via a gantry and/or a milling machine (e.g., a CNC milling machine), in various methods 100.

In the specific example of removing material from a plurality of ribs during assembly of an aircraft wing, methods 100 may include hemstitch milling at 102 and/or performing ruled milling at 104 to an extent such that a plane defined by respective upper surfaces of the plurality of ribs is sufficiently complementary to a skin panel to be applied to the plurality of ribs such that the skin panel may be applied to the ribs.

Illustrative, non-exclusive examples of inventive subject matter according to the present disclosure are described in the following enumerated paragraphs:

A1. A dual cutting milling tool for removing material from a workpiece, comprising:

a shank extending longitudinally from a proximal end region to a distal end region, wherein the dual cutting milling tool is configured to be secured to a milling machine via the proximal end region;

a first cutting portion formed in the shank and configured to perform hemstitch milling on the workpiece; and a second cutting portion formed in the shank and configured to perform ruled milling on the workpiece, wherein the dual cutting milling tool is configured to perform both ruled and hemstitch machining without a tool change.

A1.1. The dual cutting milling tool of paragraph A1, wherein the first cutting portion is positioned along the shank nearer to the proximal end region than is the second cutting portion.

A1.2. The dual cutting milling tool of paragraph A1, wherein the second cutting portion is positioned along the shank nearer to the proximal end region than is the first cutting portion.

A2. The dual cutting milling tool of any of paragraphs A1-A1.2, wherein the first cutting portion is bulbous.

A3. The dual cutting milling tool of any of paragraphs A1-A2, wherein the second cutting portion is cylindrical in overall shape.

A4. The dual cutting milling tool of any of paragraphs A1-A3, wherein the second cutting portion is positioned adjacent the distal end region of the shank.

A4.1. The dual cutting milling tool of any of paragraphs A1-A3, wherein the first cutting portion is positioned adjacent the distal end region of the shank.

A5. The dual cutting milling tool of any of paragraphs A1-A4.1, wherein the first cutting portion is spaced apart from the second cutting portion, along the shank.

A6. The dual cutting milling tool of any of paragraphs A1-A5, wherein the first cutting portion comprises at least one angled tooth.

A7. The dual cutting milling tool of any of paragraphs A1-A6, wherein the second cutting portion comprises at least one angled tooth.

A8. The dual cutting milling tool of any of paragraphs A1-A7, wherein the first cutting portion comprises a first zone having a first radius of curvature, and wherein the first cutting portion further comprises a second zone having a second radius of curvature, the second radius of curvature being different from the first radius of curvature.

A9. The dual cutting milling tool of paragraph A8, wherein the first zone and the second zone are smoothly continuous with one another.

A10. The dual cutting milling tool of paragraph A8 or A9, wherein a curve defined by the first zone and the second zone is continuously differentiable.

A11. The dual cutting milling tool of any of paragraphs A1-A10, wherein a first overall maximum diameter of the first cutting portion is greater than a second overall maximum diameter of the second cutting portion.

A12. The dual cutting milling tool of any of paragraphs A1-A11, wherein a first longitudinal height of the first cutting portion is less than a second longitudinal height of the second cutting portion.

A13. The dual cutting milling tool of paragraph A1, wherein the second longitudinal height is at least fifty percent of an overall height of the dual cutting milling tool.

B1. A system, comprising:
the dual cutting milling tool of any of paragraphs A1-A13;
a CNC milling machine and/or a gantry supporting the dual cutting milling tool with respect to the workpiece, wherein the CNC milling machine and/or gantry is configured to move the dual cutting milling tool with respect to the workpiece, and wherein the dual cutting milling tool is configured to prepare the workpiece for assembly.

B2. The system of paragraph B1, wherein the workpiece comprises a portion of an aircraft.

B3. The system of any of paragraphs B1-B2, wherein the workpiece comprises a wing for an/the aircraft.

B4. The system of any of paragraphs B1-B3, wherein the workpiece comprises a plurality of ribs of a/the wing for an/the aircraft.

B5. The system of any of paragraphs B1-B4, wherein the system is configured to remove material from a plurality of different locations of the workpiece.

C1. A method, comprising:
hemstitch milling a workpiece with the first cutting portion of the dual cutting milling tool of any of paragraphs A1-A13; and
performing ruled milling of the workpiece with the second cutting portion of the dual cutting milling tool, without changing tools in the milling machine.

C2. The method of paragraph C1, wherein the workpiece comprises a wing for an aircraft.

C3. The method of any of paragraphs C1-C2, wherein the workpiece comprises a plurality of ribs for a/the wing for an/the aircraft.

C4. The method of any of paragraphs C1-C3, wherein the hemstitch milling is performed after the ruled milling.

C5. The method of any of paragraphs C1-C4, wherein the hemstitch milling is performed prior to the ruled milling.

C6. The method of any of paragraphs C1-C5, comprising arranging the dual cutting milling tool with respect to the workpiece such that the first cutting portion contacts the workpiece and the second cutting portion is spaced apart from the workpiece.

C7. The method of paragraph C6, wherein the arranging is performed prior to the hemstitch milling.

C8. The method of any of paragraphs C1-C7, comprising arranging the dual cutting milling tool with respect to the workpiece such that the second cutting portion contacts the workpiece and the first cutting portion is spaced apart from the workpiece.

C9. The method of paragraph C8, wherein the arranging is performed prior to the ruled milling.

C10. The method of any of paragraphs C1-C9, further comprising repositioning the dual cutting milling tool with respect to the workpiece, wherein the repositioning is performed between the hemstitch milling and the ruled milling.

C11. The method of any of paragraphs C1-C10, wherein the hemstitch milling is performed at multiple locations of the workpiece.

C12. The method of any of paragraphs C1-C11, wherein the ruled milling is performed at multiple locations of the workpiece.

C13. The method of any of paragraphs C1-C12, further comprising moving the dual cutting milling tool with respect to the workpiece, via a gantry and/or CNC milling machine.

C14. The method of any of paragraphs C1-C13, wherein the hemstitch milling comprises hemstitch milling a/the plurality of ribs for a/the wing for an/the aircraft such that a plane defined by respective upper surfaces of the plurality of ribs is sufficiently complementary to a skin to be applied to the plurality of ribs.

C15. The method of any of paragraphs C1-C14, wherein the ruled milling comprises rule milling a/the plurality of ribs for a/the wing for an/the aircraft such that a plane defined by respective upper surfaces of the plurality of ribs is sufficiently complementary to a skin to be applied to the plurality of ribs.

D1. Use of the dual cutting milling tool of any of paragraphs A1-A13 to remove material from a workpiece.

D2. Use of the dual cutting mill tool of any of paragraphs A1-A13 to rule mill and hemstitch mill a plurality of ribs of an aircraft wing.

D3. Use of the system of any of paragraphs B1-B5 to remove material from the workpiece.

D4. Use of the system of any of paragraphs B1-B5 to rule mill and hemstitch mill a plurality of ribs of an aircraft wing.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components, of the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A dual cutting milling tool for removing material from a workpiece, comprising:
   a shank extending longitudinally from a proximal end region to a distal end region, wherein the dual cutting milling tool is configured to be secured to a milling machine via the proximal end region;
   a first cutting portion formed in the shank, wherein the first cutting portion is configured to perform hemstitch milling on the workpiece when the first cutting portion contacts the workpiece; and
   a second cutting portion formed in the shank, wherein the second cutting portion is configured to perform ruled milling on the workpiece when the second cutting portion contacts the workpiece, wherein the dual cutting milling tool is configured to perform both ruled and hemstitch milling without a tool change, wherein the dual cutting milling tool is configured such that the second cutting portion does not contact the workpiece when the first cutting portion is being used to perform hemstitch milling on the workpiece, and wherein the dual cutting milling tool is configured such that the first cutting portion does not contact the workpiece when the second cutting portion is being used to perform ruled milling on the workpiece.

2. The dual cutting milling tool according to claim 1, wherein the first cutting portion is bulbous.

3. The dual cutting milling tool according to claim 1, wherein the second cutting portion is cylindrical in overall shape.

4. The dual cutting milling tool according to claim 1, wherein the second cutting portion is positioned adjacent the distal end region of the shank.

5. The dual cutting milling tool according to claim 4, wherein the first cutting portion is spaced apart from the second cutting portion, along the shank, such that the first cutting portion is positioned nearer the proximal end region than is the second cutting portion.

6. The dual cutting milling tool according to claim 1, wherein the first cutting portion comprises at least a first angled tooth, and wherein the second cutting portion comprises at least a second angled tooth.

7. The dual cutting milling tool according to claim 1, wherein the first cutting portion comprises a first zone having a first radius, and wherein the first cutting portion further comprises a second zone having a second radius, the second radius being different from the first radius, wherein the first zone and the second zone are smoothly continuous with one another.

8. A system, comprising:
   the dual cutting milling tool according to claim 1; and a CNC milling machine supporting the dual cutting milling tool with respect to the workpiece, wherein the CNC milling machine is configured to move the dual cutting milling tool with respect to the workpiece, and wherein the dual cutting milling tool is configured to prepare the workpiece for assembly.

9. The system according to claim 8, wherein the workpiece comprises a plurality of ribs of a wing for an aircraft.

10. A method, comprising:
hemstitch milling a workpiece by contacting the workpiece with a first cutting portion of a dual cutting milling tool; and
ruled milling the workpiece by contacting the workpiece with a second cutting portion of the dual cutting milling tool, without changing tools in a milling machine, wherein the dual cutting milling tool comprises a shank extending longitudinally from a proximal end region to a distal end region, wherein the dual cutting milling tool is configured to be secured to the milling machine via the proximal end region, wherein the first cutting portion is formed in the shank and configured to perform the hemstitch milling on the workpiece, wherein the second cutting portion is formed in the shank and configured to perform the ruled milling on the workpiece, wherein the first cutting portion is positioned along the shank spaced apart from the second cutting portion, and wherein the dual cutting milling tool is configured such that the second cutting portion does not contact the workpiece during the hemstitch milling of the workpiece, and wherein the dual cutting milling tool is configured such that the first cutting portion does not contact the workpiece during the ruled milling of the workpiece.

11. The method according to claim 10, wherein the workpiece comprises a plurality of ribs for a wing for an aircraft.

12. The method according to claim 10, comprising arranging the dual cutting milling tool with respect to the workpiece such that the first cutting portion contacts the workpiece and the second cutting portion is spaced apart from the workpiece.

13. The method according to claim 12, wherein the arranging is performed prior to the hemstitch milling.

14. The method according to claim 10, comprising arranging the dual cutting milling tool with respect to the workpiece such that the second cutting portion contacts the workpiece and the first cutting portion is spaced apart from the workpiece.

15. The method according to claim 14, wherein the arranging is performed prior to the ruled milling.

16. The method according to claim 10, further comprising repositioning the dual cutting milling tool with respect to the workpiece, wherein the repositioning is performed between the hemstitch milling and the ruled milling.

17. The method according to claim 10, wherein the hemstitch milling is performed at multiple locations of the workpiece.

18. The method according to claim 10, wherein the ruled milling is performed at multiple locations of the workpiece.

19. The method according to claim 10, further comprising moving the dual cutting milling tool with respect to the workpiece, via a CNC milling machine.

20. The method according to claim 10, wherein the hemstitch milling comprises hemstitch milling a plurality of ribs for a wing for an aircraft such that a plane defined by respective upper surfaces of the plurality of ribs is sufficiently complementary to a skin to be applied to the plurality of ribs.

* * * * *